(12) United States Patent
Lysaght

(10) Patent No.: US 7,219,325 B1
(45) Date of Patent: May 15, 2007

(54) EXPLOITING UNUSED CONFIGURATION MEMORY CELLS

(75) Inventor: Patrick Lysaght, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 717 days.

(21) Appl. No.: 10/719,341

(22) Filed: Nov. 21, 2003

(51) Int. Cl.
*G06F 17/50* (2006.01)
*G06F 9/00* (2006.01)
*G06F 15/177* (2006.01)

(52) U.S. Cl. .............................. 716/16; 716/18; 713/1; 713/100

(58) Field of Classification Search ................. 716/16, 716/18; 713/1, 2, 100
See application file for complete search history.

(56) References Cited

U.S. PATENT DOCUMENTS

| | | | | |
|---|---|---|---|---|
| 5,189,628 | A * | 2/1993 | Olsen et al. ................... | 716/7 |
| 5,452,467 | A * | 9/1995 | May et al. ..................... | 716/1 |
| 5,784,291 | A * | 7/1998 | Chen et al. .................... | 716/10 |
| 5,928,338 | A | 7/1999 | Lawman | |
| 6,047,127 | A * | 4/2000 | McCarten et al. .......... | 717/173 |
| 6,446,242 | B1 * | 9/2002 | Lien et al. .................... | 716/6 |
| 6,496,971 | B1 * | 12/2002 | Lesea et al. .................. | 716/16 |
| 6,502,189 | B1 * | 12/2002 | Westby .......................... | 713/1 |
| 7,028,281 | B1 * | 4/2006 | Agrawal et al. .............. | 716/12 |
| 2003/0208723 | A1 * | 11/2003 | Killian et al. ................. | 716/1 |
| 2004/0158699 | A1 * | 8/2004 | Rhoads et al. ................ | 713/1 |
| 2004/0177240 | A1 * | 9/2004 | Yang ............................. | 713/1 |
| 2005/0108662 | A1 * | 5/2005 | Morfey et al. ................ | 716/1 |
| 2006/0259878 | A1 * | 11/2006 | Killian et al. ................. | 716/1 |

FOREIGN PATENT DOCUMENTS

EP         858167 A1 * 8/1998

OTHER PUBLICATIONS

Selvaraj et al., "FSM Implementation in Embedded Memory Blocks of Programmable Logic Devices Usign Functional Decomposition", Proceedings of International Conference on Information Technology: Coding and Computing, Apr. 8-10, 2002, pp. 355-360.*
U.S. Appl. No. 10/407,280, filed Apr. 3, 2003, Sundarajan et al.

* cited by examiner

*Primary Examiner*—Phallaka Kik
(74) *Attorney, Agent, or Firm*—Edward S. Mao

(57) ABSTRACT

A programmable device having a processing core is configured to use a subset of configuration memory cells as read/write memory. The subset of memory cells is a don't care set that includes configuration memory cells that can be set or reset without modifying the function or behavior of the configured circuits of the programmable device.

17 Claims, 5 Drawing Sheets

EXPLOITING UNUSED CONFIGURATION MEMORY CELLS

FIELD OF THE INVENTION

The present invention relates to integrated circuits having configuration memory cells. More specifically, the present invention relates to allowing a subset of the configuration memory cells to be used as read/write memory.

BACKGROUND OF THE INVENTION

Due to advancing semiconductor processing technology, integrated circuits have greatly increased in functionality and complexity. For example, programmable devices such as field programmable gate arrays (FPGAs) and programmable logic devices (PLDs), can incorporate ever-increasing numbers of functional blocks and more flexible interconnect structures to provide greater functionality and flexibility.

FIG. 1 is a simplified schematic diagram of a conventional FPGA 110. FPGA 110 includes user logic circuits such as input/output blocks (IOBs) 160, configurable logic blocks (CLBs) 150, and programmable interconnect 130, which contains programmable switch matrices (PSMs). Each IOB includes a bonding pad (not shown) to connect the various user logic circuits to pins (not shown) of FPGA 110. Some FPGAs separate the bonding pad from the IOB and may include multiple IOBs for each bonding pad. Other FPGA arrangements are known to those of skill in the art.

Configuration port 120 is typically coupled to external pins of FPGA 110 through various bonding pads to provide an interface for external configuration devices to program the FPGA. Each CLB can be configured through configuration port 120 to perform a variety of functions. Programmable interconnect 130 can be configured to provide electrical connections among the various CLBs and IOBs by configuring the PSMs and other programmable interconnect points (PIPS, not shown) through configuration port 120. IOBs can be configured to drive output signals to the corresponding pin of the FPGA, to receive input signals from the corresponding pins of FPGA 110, or to be bi-directional.

FPGA 110 also includes dedicated internal logic. Dedicated internal logic performs specific functions and can only be minimally configured by a user. Configuration port 120 is one example of dedicated internal logic. Other examples may include dedicated clock nets (not shown), delay lock loops (DLL) 180, block RAM (not shown), power distribution grids (not shown), and boundary scan logic 170 (i.e., IEEE Boundary Scan Standard 1149.1, not shown).

FPGA 110 is illustrated with 16 CLBs, 16 IOBs, and 9 PSMs for clarity only. Actual FPGAs may, for example, contain thousands of CLBs, thousands of PSMs, hundreds of IOBs, and hundreds of pads. Furthermore, FPGA 110 is not drawn to scale. For example, a typical pad in an IOB may occupy more area than a CLB, or PSM. The ratio of the number of CLBs, IOBs, PSMs, and pads can also vary. Also, other FPGA architectures are known to those of skill in the art.

FPGA 110 also includes dedicated configuration logic circuits to program the user logic circuits. Specifically, each CLB, IOB, and PSM contains a configuration memory cells (not shown) that must be configured before each CLB, IOB, or PSM can perform a specified function. Typically, the configuration memory cells within an FPGA use static memory cells. The configuration memory cells of FPGA 110 are connected by a configuration structure (not shown) to configuration port 120 through a configuration access port (CAP) 125. A configuration port (a set of pins used during the configuration process) provides an interface for external configuration devices to program the FPGA. The configuration memories are typically arranged in rows and columns. The columns are loaded from a frame register which is in turn sequentially loaded from one or more sequential bitstreams. (The frame register is part of the configuration structure referenced above.) In FPGA 110, configuration access port 125 is essentially a bus access point that provides access from configuration port 120 to the configuration structure of FPGA 110.

FIG. 2 illustrates a conventional method used to configure FPGA 110. Specifically, FPGA 110 is coupled to a configuration device 230, such as a serial programmable read only memory (SPROM), an electrically programmable read only memory (EPROM), or a microprocessor. Configuration port 120 receives configuration data, usually in the form of a configuration bitstream, from configuration device 230. Typically, configuration port 120 contains a set of mode pins, a clock pin and a configuration data input pin. Configuration data from configuration device 230 is typically transferred serially to FPGA 110 through a configuration data input pin. In some embodiments of FPGA 110, configuration port 120 comprises a set of configuration data input pins to increase the data transfer rate between configuration device 230 and FPGA 110 by transferring data in parallel. Further, some FPGAs allow configuration through a boundary scan chain.

Many FPGA designs have become so sophisticated that they can be configured to include processing cores. For example, FIG. 3 illustrates a FPGA design using FPGA 110, where the configuration logic blocks in the top left corner have been configured into a processing core 310. As explained above, FPGA 110 is greatly simplified. Actual FPGAs may need hundreds of configuration logic blocks to implement a processing core. In some FPGAs a processing core is embedded directly on the FPGA without use of configurable logic. In general processing core 310 would be coupled to an external memory system. In many situations, access to on-chip memory may enhance the performance of processing core 310. While the configuration logic blocks of many FPGA can be configured to provide a limited amount of read/write memory, including a large number of dedicated on-chip memory cells on an FPGA may not be cost effective because many designs would not require the on-chip memories. Thus, there is a need for a circuit or a method to provide on-chip memory on an FPGA without increasing the cost of the FPGA.

SUMMARY

The present invention allows a processing core or other circuitry on a programmable device to use a subset of the configuration memory cells as read/write memory. The configuration memory cells may be separated into a care set of configuration memory cells and a "don't care" set of configuration memory cells. Configuration memory cells that can be set or reset without changing the function or behavior of the configured logic circuits of the programmable device can be included in the don't care set. For example, the don't care set can include configuration memory cells associated with unused portions of the programmable device. In addition the don't care set can include some of the configuration memory cells associated with partially configured configurable logic blocks. The don't care set of configuration memory cells can be used as read/write memory by the processing core.

In an embodiment of the present invention, an internal configuration access port allows a processing core in a programmable device access to the configuration memory cells of the programmable device. The processing core treats the set of don't care configuration memory cells as an additional memory device, which can be mapped into the memory space of the processing core. Some embodiments of the present invention also include a memory management unit to translate memory accesses by the processing core to the protocol used to access the configuration memory cells.

The present invention will be more fully understood in view of the following description and drawings.

DETAILED DESCRIPTION

Figure 4:
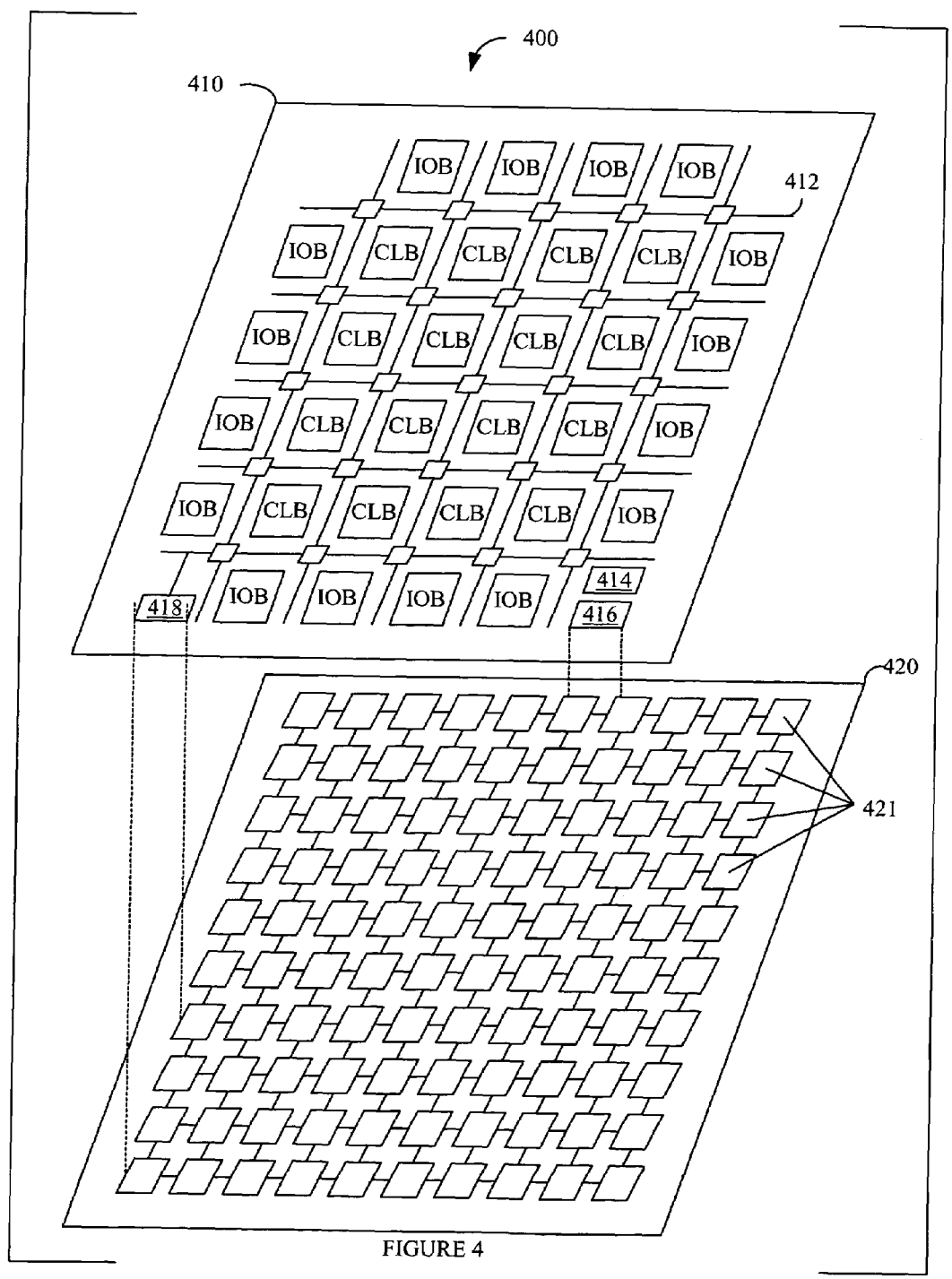
FIG. 4 is a conceptual diagram of a field programmable gate array showing the configuration memory cells.

FIG. 4 illustrates a conceptual view of a FPGA 400. FPGA 400 is conceptually divided into a programmable logic plane 410, which contains the configurable logic blocks (CLB), input/output blocks (10B), a programmable interconnect 412, a configuration port 414, a configuration access port 416, and an internal configuration access port 418, and a configuration plane 420, which contains the configuration memory cells 421. In an actual FPGA the configuration memory cells and programmable elements are interspersed on the integrated circuit. Note that while this example describes an FPGA, a variety of programmable devices may be used in accordance with the present invention.

Figure 1:
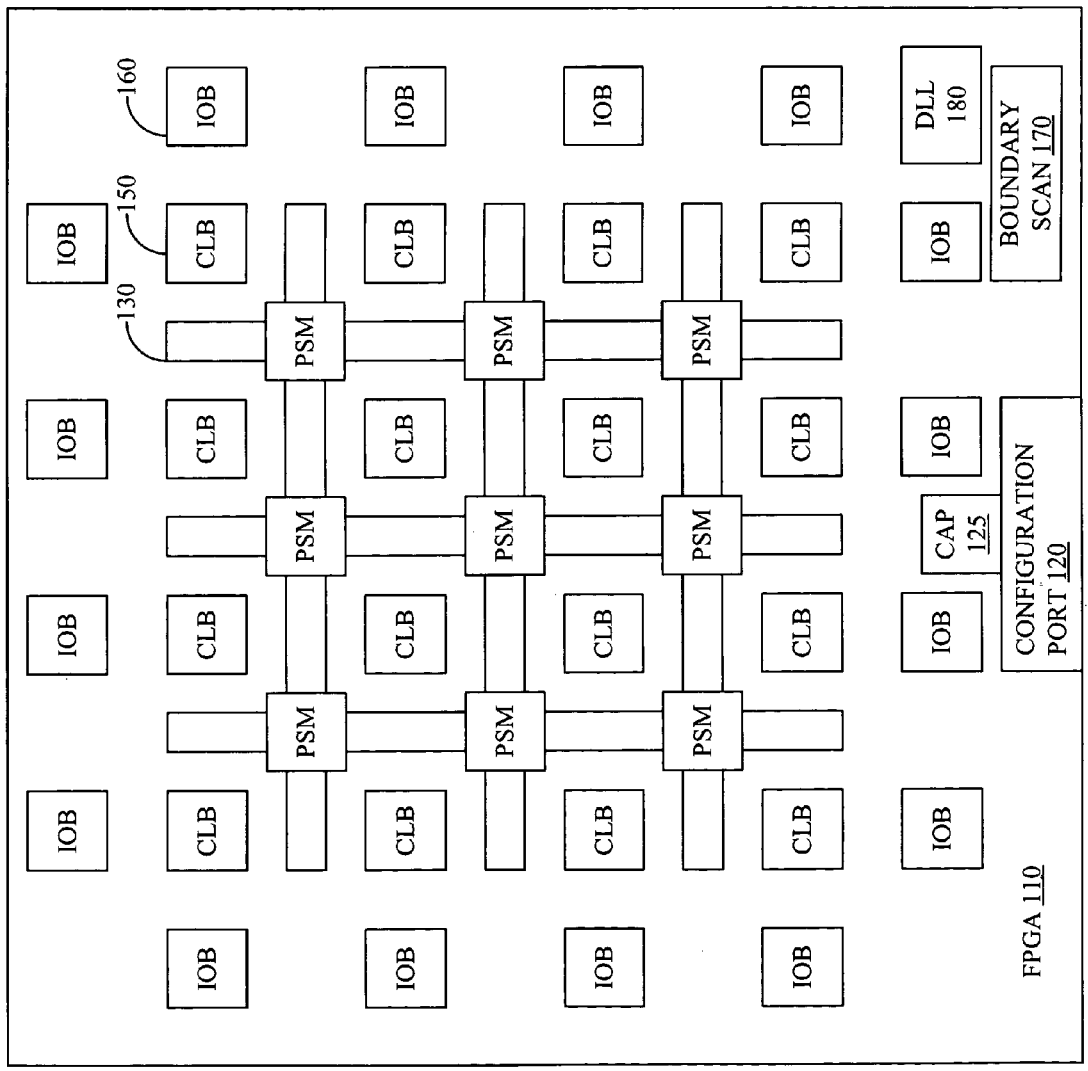
FIG. 1 is a simplified block diagram of an field programmable gate array.
Figure 2:
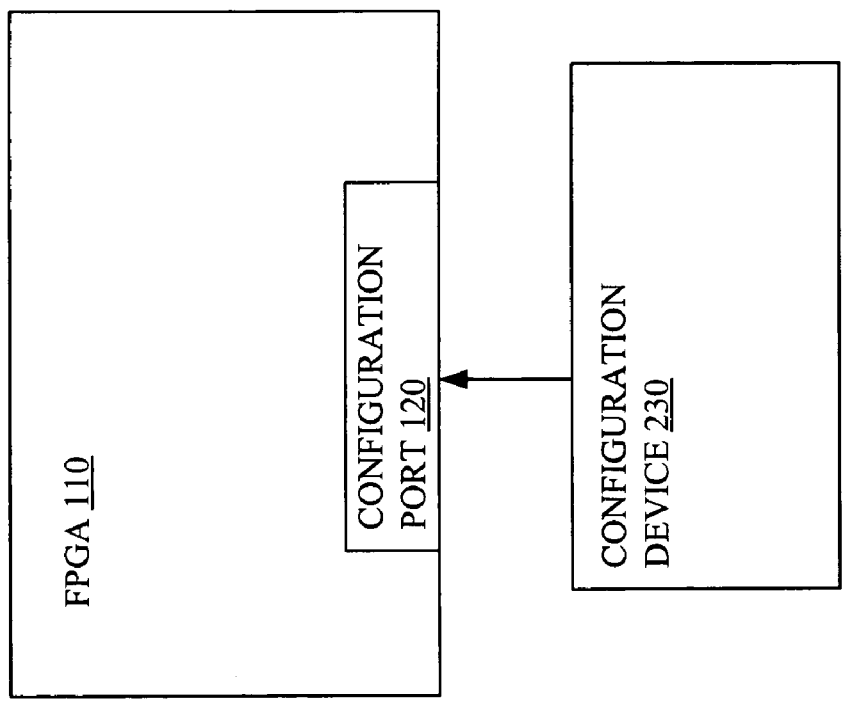
FIG. 2 is a block diagram of an FPGA configured with a configuration device.
Figure 3:
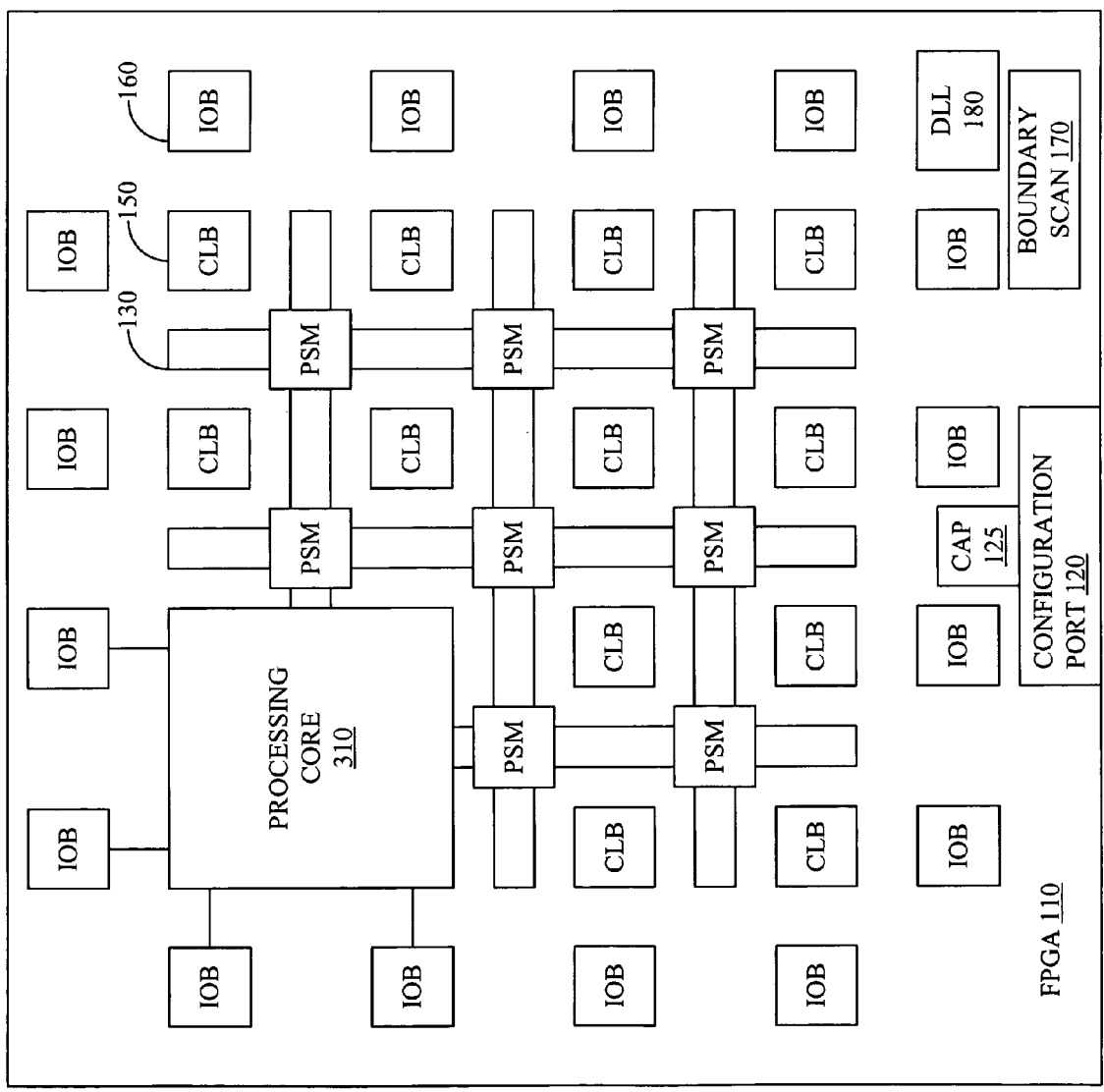
FIG. 3 is a simplified block diagram of a field programmable gate array configured with a processing core.

Each programmable element in programmable logic plane 410 is configured by one more associated configuration memory cells on configuration plane 420. Configuration memory cells can be configured using configuration port 414 and configuration access port 416 as described above with respect to FIG. 2. In FPGA 400, configuration memory cells can also be configured using internal configuration access port 418. Internal configuration access port 418 is coupled to programmable interconnect 412 so configured logic circuits, such as a processing core, can configure configuration memory cells through internal configuration access port 418. In some embodiments of the present invention a single dual-ported configuration access port may be used in place of internal configuration access port 418 and configuration access port 416.

As explained above, FPGAs that are configured with processing cores may have need of on-chip memory to enhance performance and save costs. In accordance with the present invention, an FPGA configured with a processing core can use the configuration memory cells of the FPGA as read/write memory. However, not all of the configuration memory cells can be used as read/write memory. Specifically, configuration memory cells which are associated with parts of the FPGA that are configured to perform specific functions should not be used for read/write memory because the functionality of the FPGA would be affected.

Thus, the configuration memory cells are divided into a "care set" and a "don't care" set. A configuration memory cell is a member of the care set if changing the state of the configuration memory cell causes a change in the function or behavior of a configured circuit in the FPGA design. In contrast, the don't care set contains configuration memory cells that may be set or reset without having any effect on the configured circuits of the FPGA design. Because correctly classifying every configuration memory cell may be difficult, the don't care set need not include every configuration memory cell that can be set or reset without having any effect on the configured circuits of the FPGA design. Furthermore, some configuration memory cells that could be members of the don't care set may be isolated and therefore difficult to access. Intentionally, leaving these configuration memory cells out of the don't care set may improve memory performance. In a typical FPGA design only 30-40% of the configuration memory cells may be in the care set. Thus, in most FPGA designs up to 70% of the configuration memory cells may be in the don't care set. In current FPGAs (circa 2003) the don't care set may include 1 to 2 megabytes of configuration memory cells. In the near future, the don't care set of programmable may increase by an order of magnitude.

The architecture including the association between configuration memory cells and configurable logic circuits of some FPGAs, such as the Xilinx 6200 family of FPGAs, are fully disclosed. Thus identifying the members of the don't care set is relatively straightforward. For example, configuration memory cells associated with unused areas of the FPGA are generally members of the don't care set. Similarly, the configuration memory cells associated with unused configurable logic blocks are also generally members of the don't care set. Furthermore, depending on the specific configuration of a configuration logic block, the configuration memory cells associated with unused portions of a configuration logic block may also be members of the don't care set. For example, if several configuration logic blocks are configured to form a crossbar switch, the carry chains of the configuration logic blocks would not generally be used. Thus, the configuration memory cells associated with the carry chains of these configuration logic blocks can be members of the don't care set.

In other FPGA architectures, the configuration bitstream can be reverse-engineered using public information to determine the association between the configuration memory cells and the programmable logic circuits. For example, public JBIT models for some FPGA architectures are available.

Another approach to determine which configuration memory cells are members of the don't care set is to first determine which configuration memory cells are members of the care set. The configuration memory cells that are not classified as members of the care set are then classified as members of the don't care set. To find the care set, resources used in the FPGA design are itemized and the programmable logic circuits and wiring requirements of the resources are determined. The configuration memory cells associated with the programmable logic circuits and wiring requirements are classified as members of the care set. For added safety, all configuration memory cells associated with the resources used in an FPGA may be classified as a member of the care set. A method of classifying configuration memory cells is described in U.S. patent application Ser. No. 10/407,280, filed Apr. 3, 2003, entitled "Methods of Estimating Susceptibility to Single Event Upsets for a Design Implemented in an FPGA," by Sundarajan et al., which is incorporated herein by reference.

Depending on the specific architecture of the FPGA, different protocols are used to configure the configuration memory cells. For example, in one embodiment of the present invention, the configuration memory cells are accessed using a frame based protocol. The set of configuration memory cells associated with a configuration logic block or input/output block is accessed as a major frame. Within the major frame, minor frames control the configuration memory cells of each programmable element of the configuration logic block or input/output block. When configuring a configurable logic block or input/output block, an entire major frame must be written to the configuration memory cells. To use the configuration memory cells in a read/write manner, the processing core can first read the frame from the configuration memory cells modify the appropriate bits as necessary and then write back the modified frame.

Figure 5:
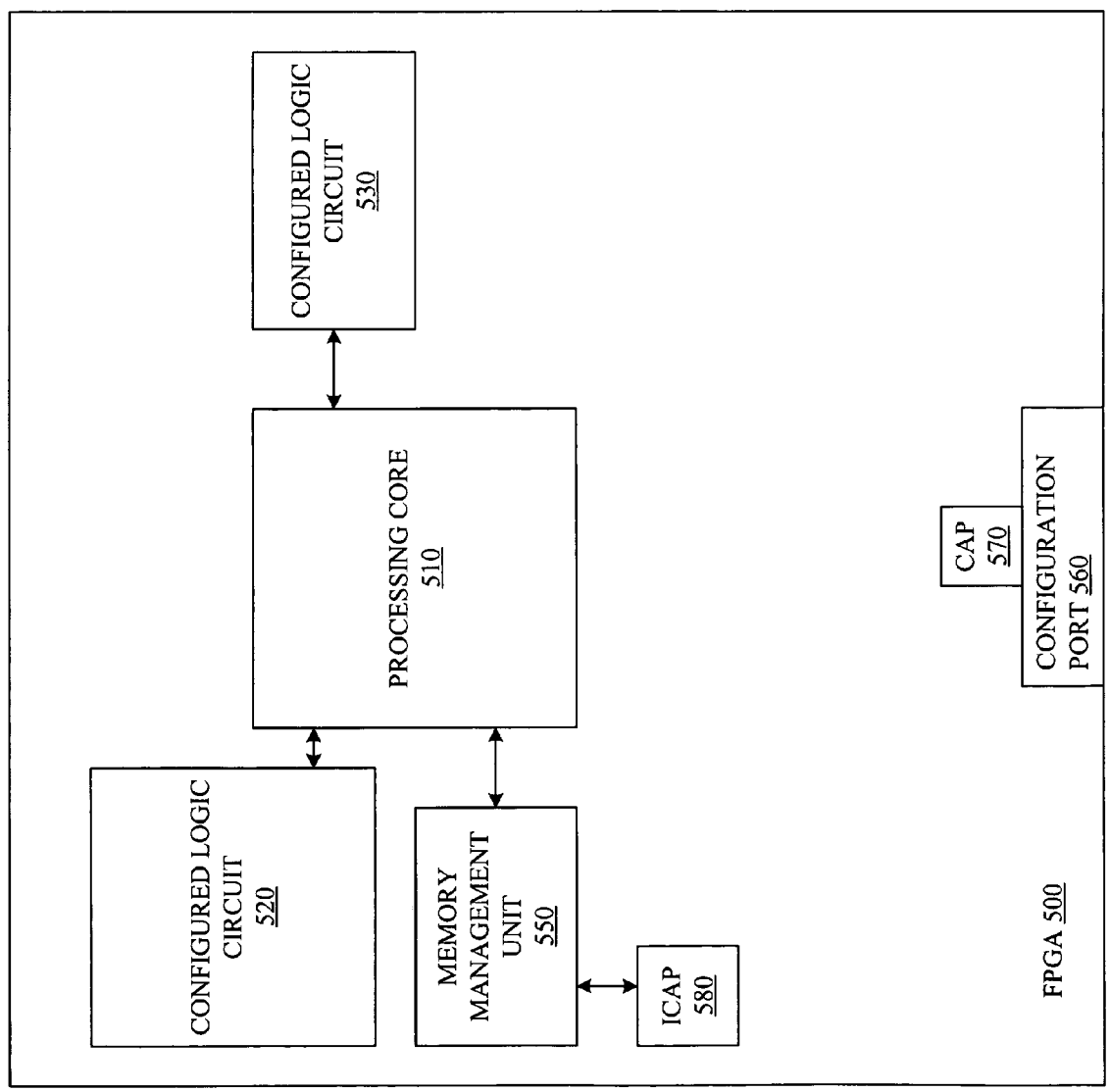
FIG. 5 is a simplified block diagram of a field programmable gate array with a memory management unit.

As illustrated in FIG. 5, some embodiments of the present invention may configure a memory management unit to facilitate using the configuration memory cells as random access read/write memories. Specifically, in FIG. 5, FPGA 500 includes a configuration port 560, a configuration access port (CAP) 570, and an internal configuration access port (ICAP) 580. FPGA 500 has been configured through configuration port 560 and configuration access port 570 to include a processing core 510 coupled to configured logic circuits 520 and 530, and a memory management unit 550. Unused configurable logic blocks and input/output blocks of FPGA 500 have been omitted for clarity. Processing core 510 is configured to access configuration memory cells that belong to the don't care set through memory management unit 550 and internal configuration access port 580. Specifically, memory management unit 550 translates memory accesses from processing core 510 to the protocol used in FPGA 500 for accessing the configuration memory cells through internal configuration access port 580. Specifically, memory management unit 550 maps the configuration memory cells that belong to the don't care set into the memory space of the processing core. Thus, by using memory management unit 550, processing core 510 can use standard memory calls to access configuration memory cells without being specially modified to use the protocol of FPGA 500 for accessing configuration memory cells. In other embodiments of the present invention, a memory management unit can be implemented in software or a combination of hardware and software.

Once the don't care set is determined, portions of the don't care set can also be used for predetermined user data. For example, in one embodiment of the present invention, predetermined user data is loaded into a subset of the configuration memory cells of the don't care set in the configuration bitstream through the configuration port. Depending on the application of the FPGA, the predetermined user data may be treated as read-only memory or initial data that can be modified during operation. For example, if the predetermined user data is a test pattern for a video device, the configuration memory cells with the predetermined user data are likely to be configured to be read-only memory. Similarly, if the predetermined user data is a look-up table for a Huffman encoder/decoder, the configuration memory cells with the predetermined user data are likely to be configured to be read-only memory. However, if the predetermined user data is initial data to be modified, the configuration memory cells with the predetermined user data may be configured as read/write memory.

The various embodiments of the structures and methods of this invention that are described above are illustrative only of the principles of this invention and are not intended to limit the scope of the invention to the particular embodiments described. For example, in view of this disclosure those skilled in the art can define other don't care sets, care sets, processing cores, internal configuration access ports, programmable devices, FPGAs, configuration memory cells, and so forth, and use these alternative features to create a method, circuit, or system according to the principles of this invention. Thus, the invention is limited only by the following claims.

What is claimed is:

1. A method of operating a programmable device having a plurality of configuration memory cells and a processing core, the method comprising:
    defining a don't care set of configuration memory cells in the plurality of configuration memory cells; and
    using the don't care set of configuration memory cells as read/write memory for the processing core.

2. The method of operating a programmable device of claim 1, further comprising configuring a portion of the programmable device as the processing core.

3. The method of operating a programmable device of claim 1, wherein the don't care set of configuration memory cells includes configuration memory cells associated with an unused portion of the programmable device.

4. The method of operating a programmable device of claim 1, wherein the don't care set of configuration memory cells includes configuration memory cells associated with a partially configured configurable logic block.

5. The method of operating a programmable device of claim 1, further comprising configuring a portion of the programmable device as a memory management unit.

6. The method of operating a programmable device of claim 1, wherein the defining the don't care set of configuration memory cells comprises:
    defining a care set of configuration memory cells; and
    defining configuration memory cells not included in the care set of configuration memory cells as the don't care set of configuration memory cells.

7. The method of operating a programmable device of claim 1, wherein the using the don't care set of configuration memory cells as read/write memory for the processing core further comprises:
    reading a frame of data from the don't care set of configuration memory cells;
    modifying a portion of the frame of data; and
    writing the frame of data to the don't care set of configuration memory cells.

8. The method of operating a programmable device of claim 1, further comprising storing predetermined user data in a subset of the don't care set of configuration memory cells.

9. The method of operating a programmable device of claim 8, wherein the storing predetermined user data in the subset of the don't care set of configuration memory cells comprises writing the predetermined user data into the subset of the don't care set of configuration memory cells from a configuration bitstream.

10. The method of operating a programmable device of claim 8, wherein the subset of the don't care set of configuration memory cells is treated as read-only memory.

11. A method of operating a programmable device having a plurality of configuration memory cells and a processing core, the method comprising:
    defining a don't care set of configuration memory cells in the plurality of configuration memory cells; and
    storing predetermined user data in a subset of the don't care set of configuration memory cells.

12. The method of operating a programmable device of claim 11, further comprising configuring a portion of the programmable device as the processing core.

13. The method of operating a programmable device of claim 11, wherein the don't care set of configuration memory cells includes configuration memory cells associated with an unused portion of the programmable device.

14. The method of operating a programmable device of claim 11, wherein the don't care set of configuration memory cells includes configuration memory cells associated with a partially configured configurable logic block.

15. The method of operating a programmable device of claim 11, wherein the defining the don't care set of configuration memory cells comprises:
    defining a care set of configuration memory cells; and
    defining configuration memory cells not included in the care set of configuration memory cells as the don't care set of configuration memory cells.

16. The method of operating a programmable device of claim 11, wherein the storing predetermined user data in the subset of the don't care set of configuration memory cells comprises writing the predetermined user data into the subset of the don't care set of configuration memory cells from a configuration bitstream.

17. The method of operating a programmable device of claim 11, wherein the subset of the don't care set of configuration memory cells is treated as read-only memory.

* * * * *